United States Patent
Hoffman et al.

(10) Patent No.: US 9,544,749 B1
(45) Date of Patent: Jan. 10, 2017

(54) APPARATUS FOR EMERGENCY COMMUNICATIONS USING DUAL SATELLITE COMMUNICATIONS SYSTEMS FOR REDUNDANCY AND A MEANS OF PROVIDING ADDITIONAL INFORMATION TO RESCUE SERVICES TO SUPPORT EMERGENCY RESPONSE

(71) Applicants: Christopher Paul Hoffman, Fareham (GB); William Cox, Sunrise, FL (US); Thomas J. Pack, Boca Raton, FL (US)

(72) Inventors: Christopher Paul Hoffman, Fareham (GB); William Cox, Sunrise, FL (US); Thomas J. Pack, Boca Raton, FL (US)

( * ) Notice: Subject to any disclaimer, the term of this patent is extended or adjusted under 35 U.S.C. 154(b) by 0 days.

(21) Appl. No.: 14/930,946

(22) Filed: Nov. 3, 2015

Related U.S. Application Data

(63) Continuation of application No. 13/772,799, filed on Feb. 21, 2013, now Pat. No. 9,178,601.

(60) Provisional application No. 61/601,139, filed on Feb. 21, 2012.

(51) Int. Cl.
*H04M 3/36* (2006.01)
*H04W 4/22* (2009.01)
*H04B 7/185* (2006.01)
*H04W 4/02* (2009.01)

(52) U.S. Cl.
CPC ........... *H04W 4/22* (2013.01); *H04B 7/18515* (2013.01); *H04B 7/18552* (2013.01); *H04W 4/023* (2013.01)

(58) Field of Classification Search
CPC .................... G08B 25/016; G08B 21/0269
USPC ............ 455/7, 11.1, 12.1, 13.1, 15, 16, 427, 428,455/429, 404.1, 404.2, 422.1, 403, 3.02, 3.01,455/3.03, 3.05, 414.1, 414.4, 445, 550.1, 575.1; 342/352, 357.21, 357.22, 357.39, 357.395; 340/539.13

See application file for complete search history.

(56) References Cited

U.S. PATENT DOCUMENTS

| | | |
|---|---|---|
| 5,497,149 A | 3/1996 | Fast |
| 5,519,403 A | 5/1996 | Bickley et al. |
| 5,914,675 A | 6/1999 | Tognazzini |
| 5,987,377 A | 11/1999 | Westerlage et al. |
| 6,085,090 A * | 7/2000 | Yee .................... G01S 5/0027 342/450 |
| 6,285,281 B1 | 9/2001 | Gatto |
| 6,662,011 B1 * | 12/2003 | Sale .................. H04B 7/18541 455/12.1 |
| 6,771,163 B2 | 8/2004 | Linnett et al. |
| 7,215,282 B2 | 5/2007 | Boling et al. |

(Continued)

OTHER PUBLICATIONS

Todd Hara, Orbcomm PCS Available Now!, Military Communications Conference, 1995. MILCOM '95, Conference Record, IEEE, 1995, pp. 874-878, vol. 2, IEEE, USA.

(Continued)

*Primary Examiner* — Keith Ferguson
(74) *Attorney, Agent, or Firm* — Malin Haley DiMaggio & Bowen, P.A.

(57) ABSTRACT

Method and apparatus for emergency communications using dual satellite communication systems for redundancy and a means of providing additional information to rescue services support emergency response. The system combines the Cospas-Sarsat emergency system for 406 beacons with a secondary means of distress alerting over a commercial satellite system as well as permitting the government agencies responsible for emergency services to directly interface with the person in distress to know about his/her location and to communicate with him or her to resolve the emergency in the best possible way.

8 Claims, 5 Drawing Sheets

(56) References Cited

U.S. PATENT DOCUMENTS

| | | |
|---|---|---|
| 7,675,423 B2 | 3/2010 | Boling et al. |
| 7,830,305 B2 | 11/2010 | Boling et al. |
| 7,991,380 B2 | 8/2011 | Collins et al. |
| 8,018,332 B2 | 9/2011 | Boling et al. |
| 8,098,190 B2 | 1/2012 | Bishop et al. |
| 2004/0111195 A1 | 6/2004 | Vries et al. |
| 2006/0200842 A1 | 9/2006 | Chapman et al. |
| 2007/0057798 A1 | 3/2007 | Li et al. |
| 2010/0271198 A1 | 10/2010 | Boling et al. |
| 2011/0122019 A1* | 5/2011 | Lee ................. G01S 5/0231 342/357.25 |

OTHER PUBLICATIONS

Motorola, Inc., Satellite Series 9505 Portable Telephone User's Guide, 1999, Motorola, Inc., USA.

* cited by examiner

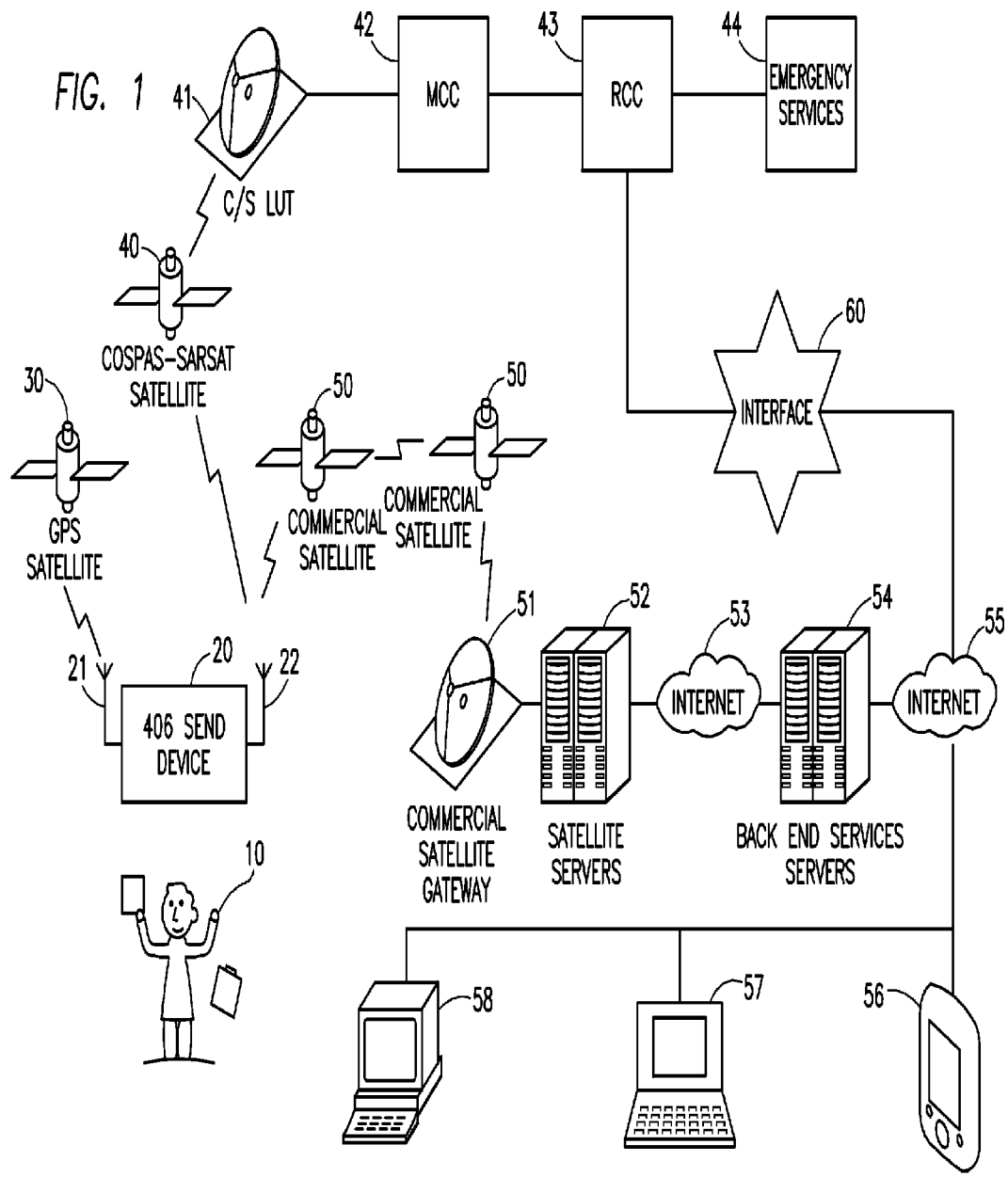

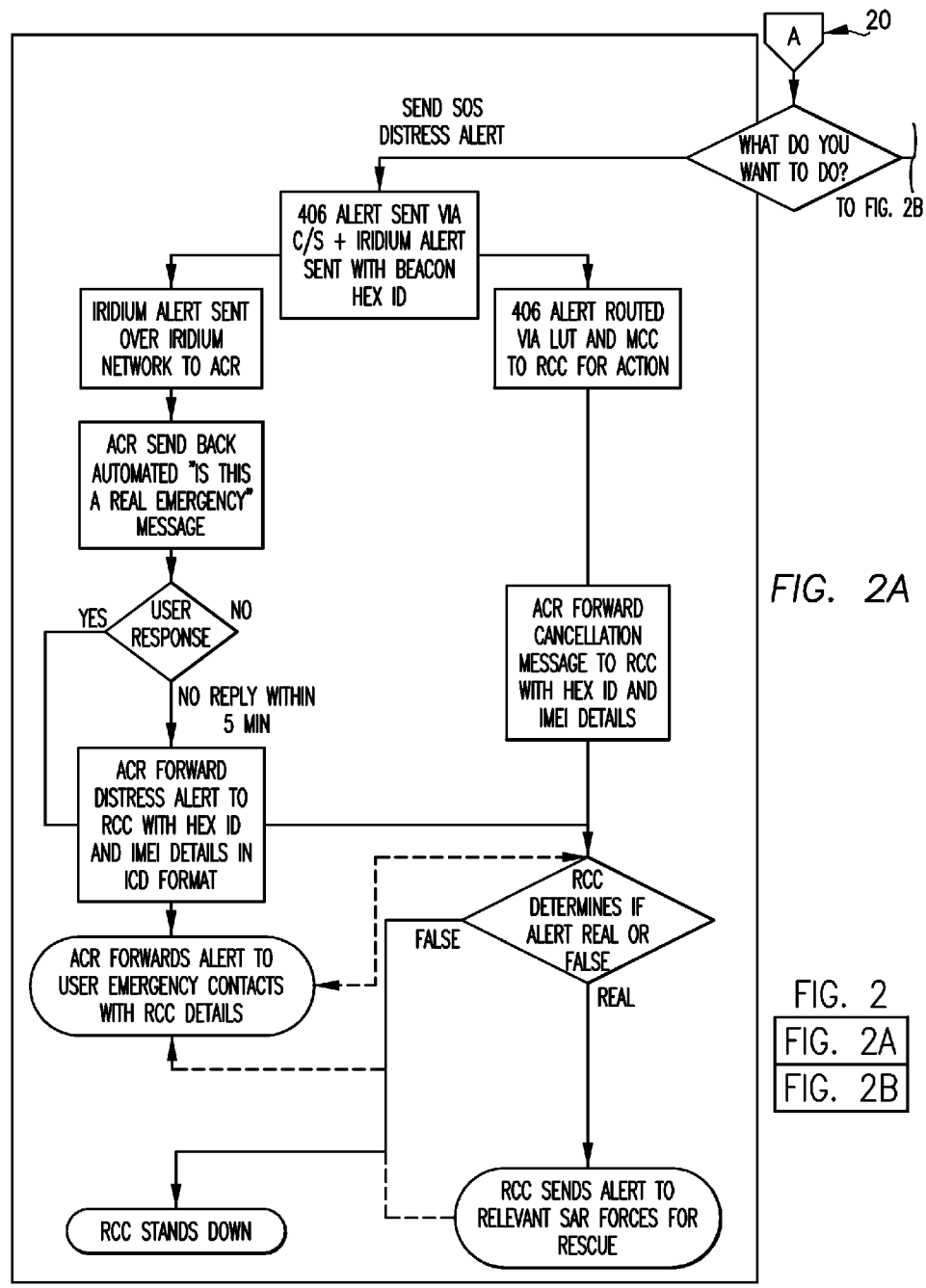

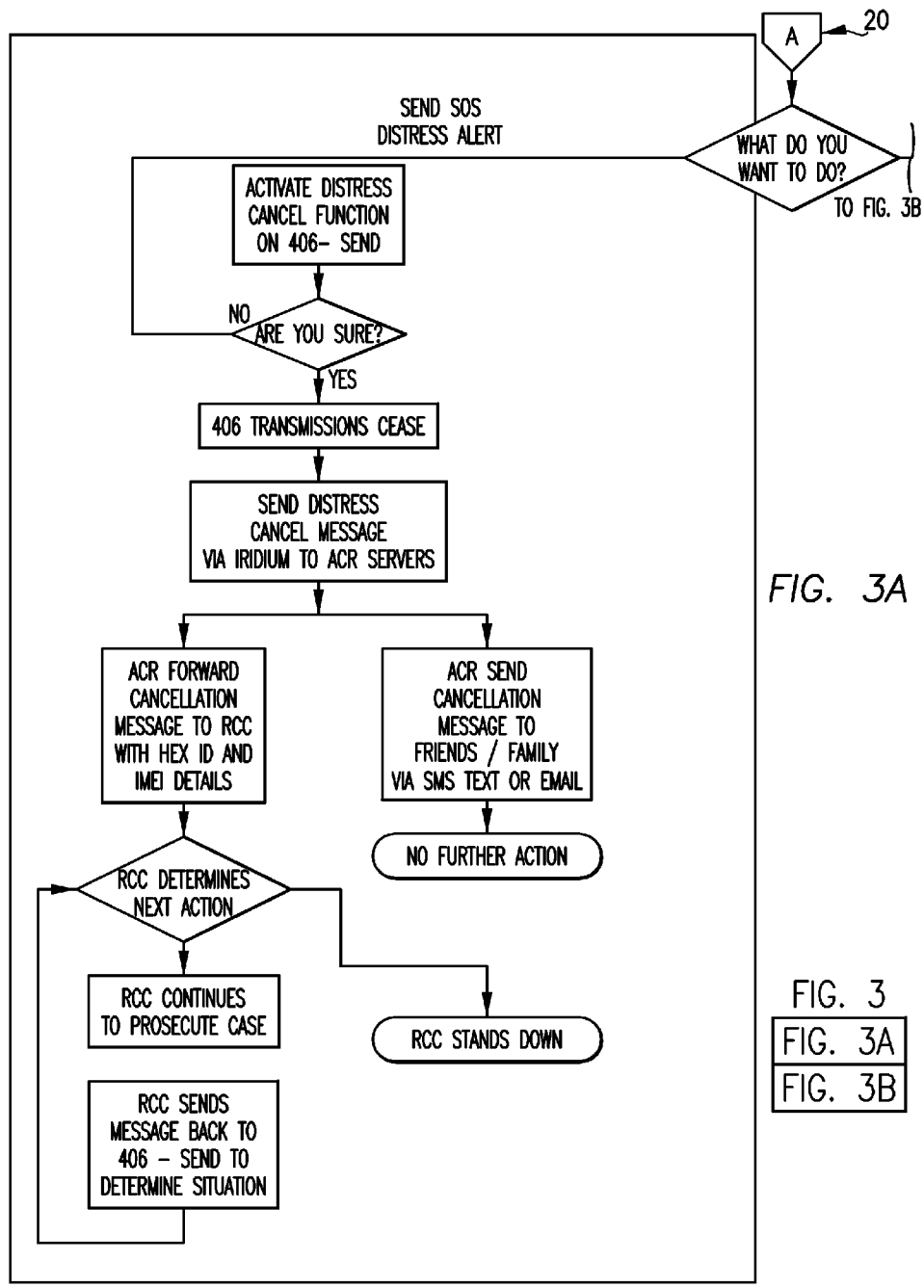

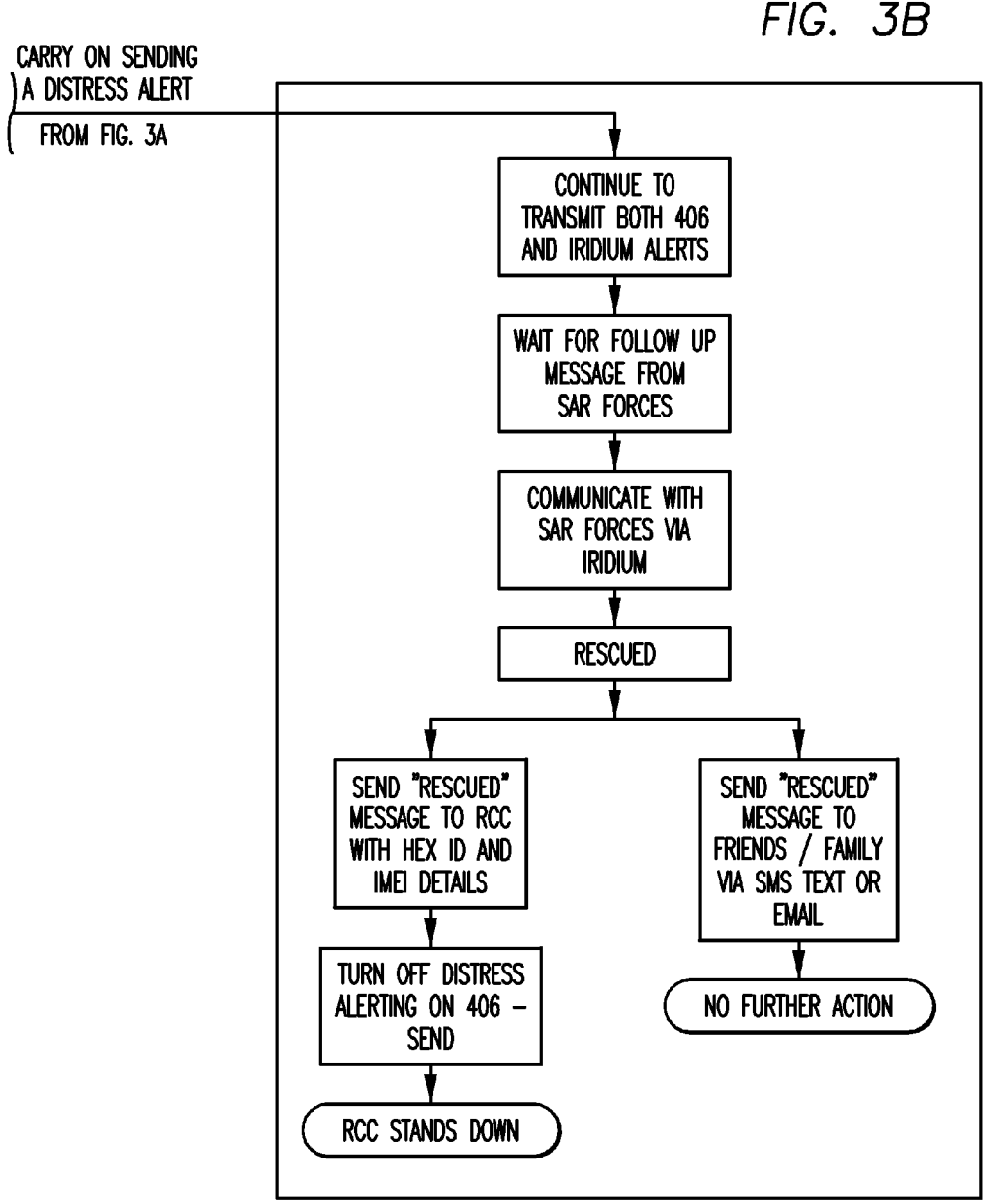

APPARATUS FOR EMERGENCY COMMUNICATIONS USING DUAL SATELLITE COMMUNICATIONS SYSTEMS FOR REDUNDANCY AND A MEANS OF PROVIDING ADDITIONAL INFORMATION TO RESCUE SERVICES TO SUPPORT EMERGENCY RESPONSE

CROSS REFERENCE TO RELATED APPLICATIONS

This application is a Continuation of U.S. patent application Ser. No. 13/772,799 filed Feb. 21, 2013, now U.S. Pat. No. 9,178,601 which claims benefit of Provisional Application No. 61/601,139 filed on Feb. 21, 2012.

BACKGROUND OF THE INVENTION

Field of the Invention

The present invention relates generally to emergency communication devices and more specifically to an apparatus for emergency communications using dual satellite communications systems for redundancy and a means of providing additional information to rescue services to support emergency response.

Description of Related Art

The Cospas-Sarsat international satellite system has been operational for many years and is well known. Its sole purpose is to provide emergency distress alerting capability from an aircraft, vessel or individual in distress to relevant emergency services, via a one way satellite communications network. The system employs three types of emergency locator beacons known as Emergency Locator Transmitters (ELTs), Emergency Position Indicating Radio Beacons (EPIRBs) and Personal Locator Beacons (PLBs) all operating in the 406.0 to 406.1 MHz frequency band. The system is unique in that it is truly global and is run by various governments for the benefit of all and sends emergency distress alerts directly to the relevant government authority responsible for rescue efforts (e.g. US Coastguard) around the world. The Cospas-Sarsat system provides a one way communications link between a beacon and one or more Cospas-Sarsat satellites. The Cospas-Sarsat satellites are in communication with one or more dispatchers who are responsible for routing a distress signal from a beacon to the appropriate first responders who carry out the rescue efforts. Specifically, the Cospas-Sarsat satellites receive a distress signal and route it one or more receiving and processing stations called LUTs, or local user terminals. The LUTs generate distress alert data which is then communicated to a Mission Control Center (MCC) whereby the MCC then routes instructions and information to localized Rescue Coordination Centers (RCC). The RCCs are then responsible for facilitating the coordination of the rescue efforts. While the Cospas-Sarsat system is effective, it is limited in that it only provides for one way communication, i.e. from the beacon to the responders, which can cause uneasiness for the person(s) in distress as well as for the responders.

More recently, commercial satellite communication systems utilizing both one way (remote user to satellite ground station only (e.g. Globalstar SPOT) or satellite ground station to remote user only (e.g. Sirius XM radio)) and two way communications have become more common and have started to be used for both emergency distress alerting and general day to day communications. These satellite communication systems are particularly useful in locations where cellular telephone antennas cannot be placed and/or where cellular telephone reception is low or non-existent. Satellite communications systems have been tailored for emergency communications through the adoption and use of Satellite Emergency Notification Devices (SENDs). Globalstar SPOT is one example of a one way version of such a device and the DeLorme InReach device is one example of a two way version of such a device. Typically, a satellite communication system operates by creating a one-way or two-way communications link between a satellite telephone or SEND and a commercial communications satellite. The commercial communications satellite may comprise the Iridium satellite system already established in the art. The communications satellite is further in communication with a satellite gateway whereby the gateway is in communication with one or more computer servers. The computer servers typically have connects to the internet, cellular telephone systems, or standard land-line telephone systems thereby allowing the satellite phone or SEND user to communicate with a plurality of other devices by way of a plurality of communications systems. In some instances, the computer servers may in communication with a particularized commercial emergency response call center that carries out specific emergency rescue operations should the satellite phone or SEND use request them or by the pressing of an "emergency" key on his device.

There are several advantages of SEND devices compared to 406 MHz beacons in that they permit communications other than pure emergency distress alerting and thus can be used on a regular basis to remain in communications when outside of an area of cellular phone coverage. In addition, SENDs can be used to track and report on the location of the remote person as well through the use of internal GPS receivers typically found in SENDs. In addition, because SENDs and satellite telephones permit two-way communications, in an emergency situation some of the satellite devices can provide to the user additional information on the emergency and rescue efforts and some can even permit communication with the person in distress by voice, data, or text message.

However, SEND devices also suffer from some disadvantages compared to 406 MHz beacons in that they currently have to forward distress alerts to a commercial emergency call center (e.g. a 911 call center) and this call center then has to communicate with the relevant emergency services. It is then difficult for the relevant emergency services to communicate backwards and forwards with the person in distress because the system is not cohesively and centrally established for emergency and rescue efforts.

Further still, while both the 406 MHz beacons and SEND systems have redundancy built into it to allow for outages in parts of the system, each is still dependent upon a single communications system that may break down or become unreliable in what can often be a life threatening situation.

It is, therefore, to the effective resolution of the aforementioned problems and shortcomings of the prior art that the present invention is directed. However, in view of the emergency beacons and related systems in existence at the time of the present invention, it was not obvious to those persons of ordinary skill in the pertinent art as to how the identified needs could be fulfilled in an advantageous manner.

SUMMARY OF THE INVENTION

The 406-SEND system of the present invention overcomes the disadvantages of both these systems by combining them together to provide a world class distress alerting system over the Cospas-Sarsat satellite network together with both a secondary means of distress alerting over a commercial satellite system, as well as permitting the government agencies responsible for emergency services to directly interface with the person in distress to know both the person being rescued's location and to communicate with the person being rescued to resolve the emergency in the best possible way.

In some embodiments, the present invention is a system for emergency communications, comprising a communications device, a first satellite communications system, and a second satellite communications system. The communications device is capable of transmitting messages over each of said first and second satellite communications systems and may include one or more transmitter/receivers to accomplish same. The first and second satellite communications systems are in bi-directional communication by way of an interface system, which interface may comprise a third-party service provider or a passive communications network. The first satellite communications system can transmit messages to the communications device over the second satellite communications system by way of the interface. Accordingly, in some cases the first satellite system is only a one-way communications network; therefore the interface allows the first system to function as a two-way communications network by permitting the transmission of messages over the second communications network.

In some embodiments, the first satellite communications system comprises a Cospas-Sarsat satellite system and the second satellite communications system comprises a commercial satellite telephone communications system, such as the Iridium satellite telephone network. In some embodiments, communications device includes a Cospas-Sarsat 406 MHz transmitter and a Satellite Emergency Notification Device (SEND) transmitter/receiver allowing for redundancy and robust communications from an emergency communication device. The communications device may also include a global positioning system (GPS) receiver which allows for the two satellite networks and the interface to obtain real-time location information about the communication device.

A method of using the system is also disclosed whereby the method comprises the steps of: providing an emergency communications interface; establishing, by said interface, a bi-directional communications link between a first satellite communications system and a second satellite communications system; wherein said first and second satellite communications systems are capable of communicating with an emergency communications device; and wherein said first satellite communications system can transmit messages to said communications device over said second satellite communications system by way of said interface.

BRIEF DESCRIPTION OF THE DRAWINGS

FIG. 1 shows a schematic diagram depicting one embodiment of the present invention.

FIGS. 2A and 2B show a flowchart of various functionality of the present invention including device operation.

FIGS. 3A and 3B show a flow chart that includes distress cancellation.

PREFERRED EMBODIMENT OF THE INVENTION

Figure 2B:
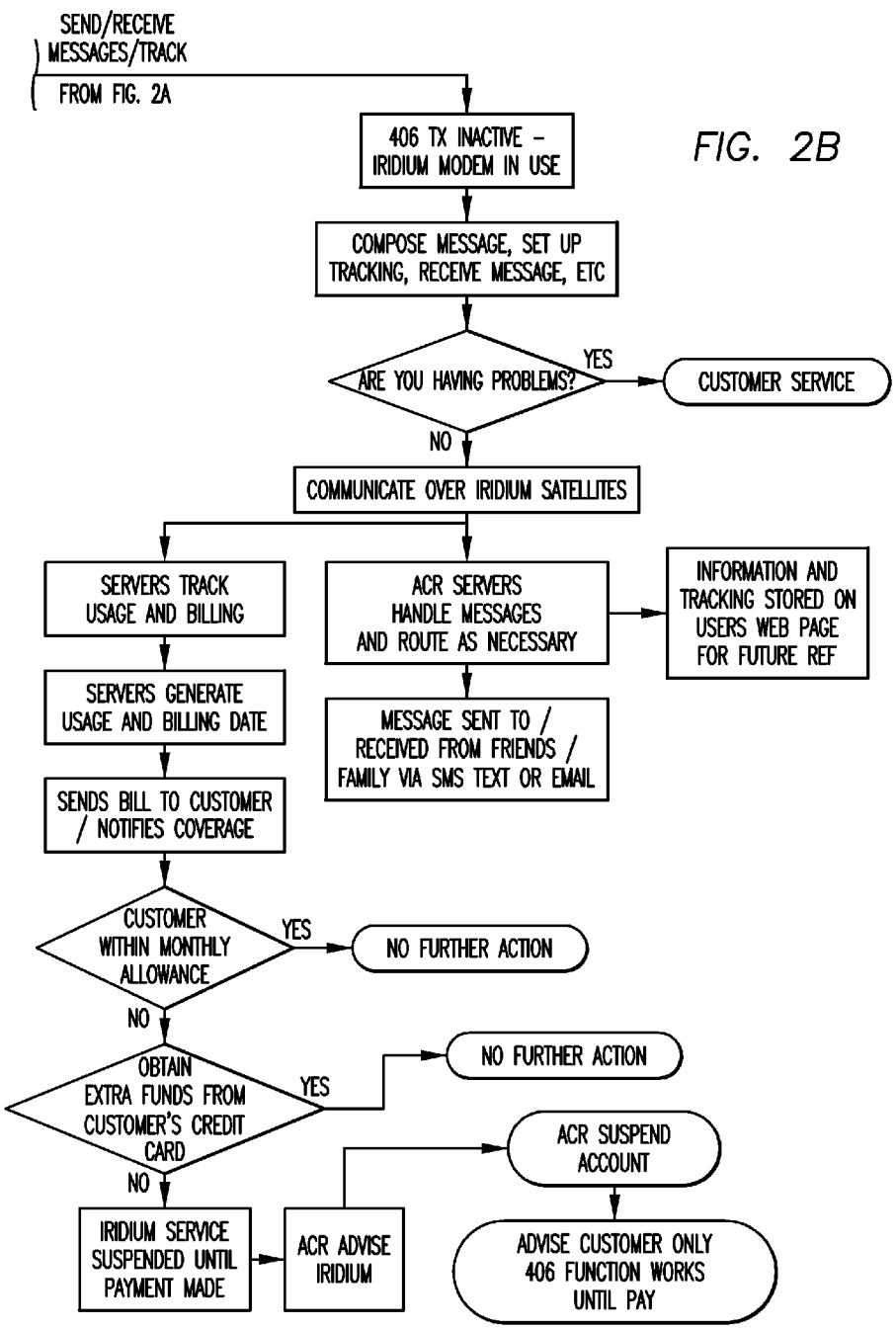

With reference to FIG. 1, shown is a schematic of one embodiment of the system and method of the present invention. Shown is a user 10 who operates 406-SEND Device 20. User 10 may be a person under distress or may simply be a person desirous of communicating via his device 20. 406-SEND device 20 includes one or more transmitter/receivers 21 and 22. In some embodiments, receiver 21 is a global positioning system (GPS) receiver that is capable of receiving location information from one or more GPS satellites 30. In some embodiments, transmitter/receiver 22 is a dual-purpose transmitter/receiver configured to simultaneously and/or selectively communicate over both a 406 MHz Cospas-Sarsat system and a commercial satellite communications system. It is appreciated that where the Cospas-Sarsat system is only a one-way communication system, the transmitter/receiver 22 is configured for that one-way communication. Further, transmitter/receiver 22 is configured for two-way communication by way of a commercial satellite system. In some embodiments, the 406-SEND device 20 includes identifiers embedded in the transmitter/receivers 21 and 22 such that the identity of the 406-SEND device 20 can be determined. In some embodiments, the device 20 includes a hexadecimal identification number corresponding to the 406 MHz Cospas-Sarsat communication protocol that it is capable of transmitting over. In some embodiments, the device 20 includes an IMEI (International Mobile Station Equipment Identity) number corresponding to the SEND commercial satellite communication protocol that device 20 is capable of transmitting over.

406-SEND device 20 is configured to selectively communicate by way of transmitter/receiver 22 to one or more Cospas-Sarsat satellites 40 and one or more commercial satellites 50. Accordingly, in some embodiments, 406-SEND device 20 is in communication with Cospas-Sarsat satellite 40 which is in turn in communication with one or more local user terminals (LUT) 41. A user 10 may generate a 406 MHz distress signal on his 406-SEND device 20 which signal is then relayed first to the Cospas-Sarsat satellite 40 and then to the LUT 41. The LUT 41 is then capable of generating distress alert data which is then communicated to a Mission Control Center (MCC) 42 whereby the MCC 42 then routes instructions and information to one or more localized Rescue Coordination Centers (RCC) 43. The RCCs 43 are then responsible for facilitating the coordination of the rescue efforts and, in some embodiments, are in communication with local emergency services 44 who carry out the actual rescue.

On the other hand, in some embodiments, the 406-SEND device 20 is in communication with one or more commercial satellites 50 which are tasked with relaying various satellite telephone communications. In some embodiments, the one or more commercial satellites 50 are in communication with a commercial satellite gateway 51 which functions as a relay point between the ground services (discussed herein) and the satellites 50. The "ground services" comprise a series of interconnected computer systems including one or more satellite servers 52 which may be in communication with the Internet 53 and further in communication with one or more back end services servers 54 which may also be in communication with the Internet 55. The back end services servers 54 are capable of communicating with a plurality of devices which allow two-way communication between those devices and the 406-SEND device 20 in the field. In some embodiments, these devices include: a cellular telephone 56 for voice, data, and text services; a personal computing device 57 such as a laptop, desktop, or mobile device for voice, data, and text (e-mail) services; and a 406-SEND-specific user interface device 58 for voice, data, and text services. The foregoing commercial satellite configuration allows for the establishment of a bi-directional communications link between one or more 406-SEND devices 20 and one or more other devices such as the aforementioned personal computer, mobile device, cellular telephone, or 406-SEND interface.

To further enhance the reliability and usefulness of the system and method of the present invention, an interface 60 is provided to establish a communications link between the back end services server 54 of the commercial satellite system and the one or more RCCs 43. In some embodiments, the back end services server 54 utilizes its internet connection 55 to communicate with RCC 43 over interface 60. The interface 60 is a specialized and critical component which allows the Cospas-Sarsat system to communicate directly with the commercial satellite system in order to provide a more robust, complete, and integrated set of communications and emergency services. In some embodiments, interface 60 may comprise an automated communications interface that is established as a joint effort by both the Cospas-Sarsat system and the commercial satellite system. In other embodiments, interface 60 may comprise a discrete third-party service provider whose primary function is to facilitate communications between the Cospas-Sarsat system and the commercial satellite system. Accordingly, interface 60 may comprise either a passive communications link or an active communications link between the Cospas-Sarsat system and the commercial satellite (SEND) system. In some embodiments, the "active" link comprises a service provider employing one or more computer networks to provide a robust set of communications services. In some embodiments, interface 60 functions as an interface to expand the one-way communications capabilities of the already-established Cospas-Sarsat system to allow for two-way communication thereof by way of the commercial satellite (SEND) system.

The system and method of the present invention provides several advantages over the prior art. Firstly, the dual satellite system (Cospas-Sarsat AND commercial satellite) offers full redundancy by allowing a user 10 to send a distress alert over both systems in parallel. The interface 60 allows for both systems to work in concert without overlap of resources or mis-communication. In some embodiments, the system passes 406 MHz distress alerts to the government-run Rescue Coordination Centers (RCCs) and permits via a direct interface 60 the SEND data to also be transmitted to that same RCC, together with the 406-SEND device's 20 identity to allow the RCC or others to reconcile the two alerts as one.

Secondly, the Cospas-Sarsat part of system permits the user 10 to employ the government-run free-of-charge global distress alerting system which is widely acknowledged to be the best in the world, in an serious emergency while also providing the communication benefits of the commercial satellite (SEND) part of system, which permits the user to contact friends, family or other services (e.g. AAA) for communications purposes or for help when situation is not necessarily life threatening. The commercial satellite (SEND) part of system permits user 10 to send and receive messages from friends, family and others on a regular non-emergency basis as well as during an emergency.

Thirdly, the commercial satellite (SEND) part of system permits user 10 to track his/her location and transmit location data over the commercial satellite system to others. This is particularly useful where interface 60 is established because the location information sent over the commercial satellite system can be relayed to the Cospas-Sarsat system in the event of an emergency.

Fourthly, the present system allows an RCC or others to communicate with the person in distress to establish if the person has a real emergency and what his/her status is in order to better respond to the alert to distress signal. By establishing a link between the RCC and the commercial satellite (SEND) system, these communication options can be further enhanced and consolidated.

Fifthly, the combined system also permits a reduction in Cospas-Sarsat false alerts by permitting the RCC or others to establish if the emergency is real or not by utilizing the interface 60 between the RCC and the commercial satellite (SEND) system. This functionality is shown in FIGS. 2A and 2B, which is a flow chart described as follows:

406-SEND device 20 is capable of sending SOS/distress alerts on one hand and can send and receive messages and location information on the other hand. If an SOS/distress alert is sent, it is sent both as a 406 MHz alert by way of Cospas-Sarsat and as a commercial satellite alert in this example by way of the Iridium commercial satellite system. On the one hand, the 406 MHz alert is routed to an MCC and then to an RCC by first being received at a LUT. The RCC then determines whether the alert is real or false and, if real, the RCC sends the alert to the relevant search and rescue forces for the rescue operations to be carried out. If the alert is determined to be false, the RCC stands down and no rescue operation is carried out.

On the other hand, an "Iridium alert" is also send over a commercial satellite system. In some embodiments, interface 60 is configured as a discrete service provided identified in FIG. 2A as "ACR." ACR provides a link between the commercial satellite Iridium system and the Cospas-Sarsat system. Accordingly, the Iridium alert sent from the device 20 is sent to ACR over the Iridium commercial satellite system. ACR then communicates back to the 406-SEND device 20 to confirm whether the emergency is real. If the user confirms that the emergency is real or the user does not respond for a predetermined period of time, i.e. 5 minutes, ACR then forwards the distress alert to the RCC, by way of its interface 60, along with the 406-SEND device's hexadecimal identification number and IMEI number. The identification numbers allow the RCC to establish the identity of the device 20. ACR optionally can send the alert and the RCC details to the user's pre-established emergency contacts so that those contacts can become aware of an emergency and can contact the relevant RCC for more details concerning the emergency.

If the user responds that the emergency is false, then ACR can forward a cancellation message to the RCC along with the device's hexadecimal identification number and IMEI number. Thereafter, the RCC can stand down. Optionally, ACR can furnish the user's emergency contacts with information concerning the distress alert whereby the RCC or ACR can inform those contacts that it was a false alarm after establishing same.

In accordance with the foregoing, the user can utilize both the 406 MHz Cospas/Sarsat system and a commercial satellite system to send an emergency alert. The interface ACR provides robust cross-communication between the two communication systems and allows for the interaction thereof in order to determine the validity and scope of a given emergency.

With reference to FIG. 2B, still yet, in some embodiments, the user 10 can utilize his 406-SEND device 20 to carry out a variety of messaging and communication features. As shown, the user can utilize the commercial satellite (SEND) features of the device 20 to compose messages, establish GPS tracking, receive messages, and the like.

Communication occurs over the commercial satellite system, in this case the "Iridium" system. The interface 60, in this case "ACR," can be utilized as well to provide robust services such as message routing, billing, and information tracking.

The combined system further permits the instigation of a distress cancel function with the Cospas-Sarsat 406 system utilizing the SEND distress cancel function and the interface between the two systems. This is shown in FIG. 3A. Here a "distress cancel" function is selected by user 10 on his 406-SEND device 20. The user is asked to confirm the cancel function and if he selects yes, the cancellation procedure is initiated. First, the 406 MHz transmission ceases. Next, a distress cancel message is sent over the commercial satellite system (SEND) portion of the 406-SEND device, denoted as "Iridium," to the service provider (interface 60) "ACR." In some embodiments, this Iridium message is received by one or more computer servers at ACR. At this point, because ACR has established an interface link between the Cospas-Sarsat system and the commercial satellite system, ACR can forward a cancellation message directly to the RCC of the Cospas-Sarsat system and also send a cancellation message as an e-mail, text message or the like over the commercial satellite system. The cancellation message sent to the RCC, in some embodiments, contains the hexadecimal identification number and/or IMEI number of the device 20 such that the RCC can identify same. The RCC can then determine the next step, such as standing down or contacting ACR back for more information.

With reference to FIG. 3B, the present invention permits a clear resolution of a rescue to be indicated by transmitting a "rescued" message over the SEND system and using this to end the Cospas-Sarsat 406 alert and close the search and rescue case. For example, if user 10 sends distress signal, device 20 will continue sending the distress signal by way of both the Cospas-Sarsat 406 MHz system and the commercial satellite system (SEND) or "Iridium." The message continues to be sent substantially as described above with respect to FIGS. 2A and 2B. The user 10 thereafter waits for a follow up message from search and rescue (SAR) personnel, who can communicate with the user 10 by way of the interface 60 between the Cospas-Sarsat system and the commercial satellite system. This interface 60 therefore effectively converts the one-way Cospas-Sarsat system into a two-way system by way of the commercial satellite system. As such, the user 10 can communication back and forth with SAR personnel by way of the Iridium commercial satellite system until the rescue has been completed. Upon completion of the rescue, the interface 60 can send a "rescued" or "rescue complete" message back to the RCC by way of the Cospas-Sarsat 406 MHz system and can send the same message to various individuals by phone, text, or e-mail over the commercial satellite system (Iridium).

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A system for emergency communications, comprising:
    a communications device, a Cospas-Sarsat satellite communications system, and a commercial satellite communications system;
    said communications device capable of transmitting messages over each of said Cospas-Sarsat and said commercial satellite communications systems including information that identifies the user of the communication device;
    said Cospas-Sarsat satellite communications system in communication with one or more local user terminals, said one or more local user terminals in communication with a mission control center, and said mission control center in communication with a rescue coordination center;
    said commercial satellite communications system in communication with a commercial satellite gateway, said commercial satellite gateway in communication with one or more servers, said servers connected to the Internet;
    wherein said Cospas-Sarsat satellite communications system and said commercial satellite communications systems are in bi-directional communication by way of an interface, said interface interconnected between said one or more servers and said rescue coordination center;
    wherein said Cospas-Sarsat satellite communications system can transmit messages to said communications device over said commercial satellite communications system by way of said interface,
    said interface being provided by a third party service provider in communication with the rescue coordinator center and the internet and the satellite communication system.

2. The system of claim 1, wherein said commercial satellite communications system comprises the Iridium satellite communications system.

3. The system of claim 1, wherein said communications device includes a Cospas-Sarsat transmitter and a Satellite Emergency Notification Device (SEND) transmitter.

4. The system of claim 3, wherein said communication device further includes a global positioning system receiver.

5. A method for establishing an emergency communications system, comprising:
    providing a communications device capable of transmitting messages over a Cospas-Sarsat and a commercial satellite communications system;
    providing said Cospas-Sarsat satellite communications system, said Cospas-Sarsat satellite communication system in communication with one or more local user terminals, said one or more local user terminals in communication with a mission control center, and said mission control center in communication with a rescue coordination center;
    providing said commercial satellite communications system, said commercial satellite communications system in communication with a commercial satellite gateway, said commercial satellite gateway in communication with one or more servers, said servers connected to the Internet;
    establishing, by way of an interface system, a bi-directional communications link between said Cospas-Sarsat communication system and said commercial satellite communications system, said interface system provided by a third party service provider,
    wherein said interface is interconnected between said one or more servers and said rescue coordination center; and
    wherein said Cospas-Sarsat satellite communications system can transmit messages to said communications device over said commercial satellite communications system by way of said interface third party service provider.

6. The method of claim 5, wherein said commercial satellite communications system comprises the Iridium satellite communications system.

7. The method of claim 5, wherein said emergency communications device includes a Cospas-Sarsat transmitter and a Satellite Emergency Notification Device (SEND) transmitter.

8. The method of claim 7, wherein said communication device further includes a global positioning system receiver.

* * * * *